Figures 1, 2, 3, 4, 5, 6:
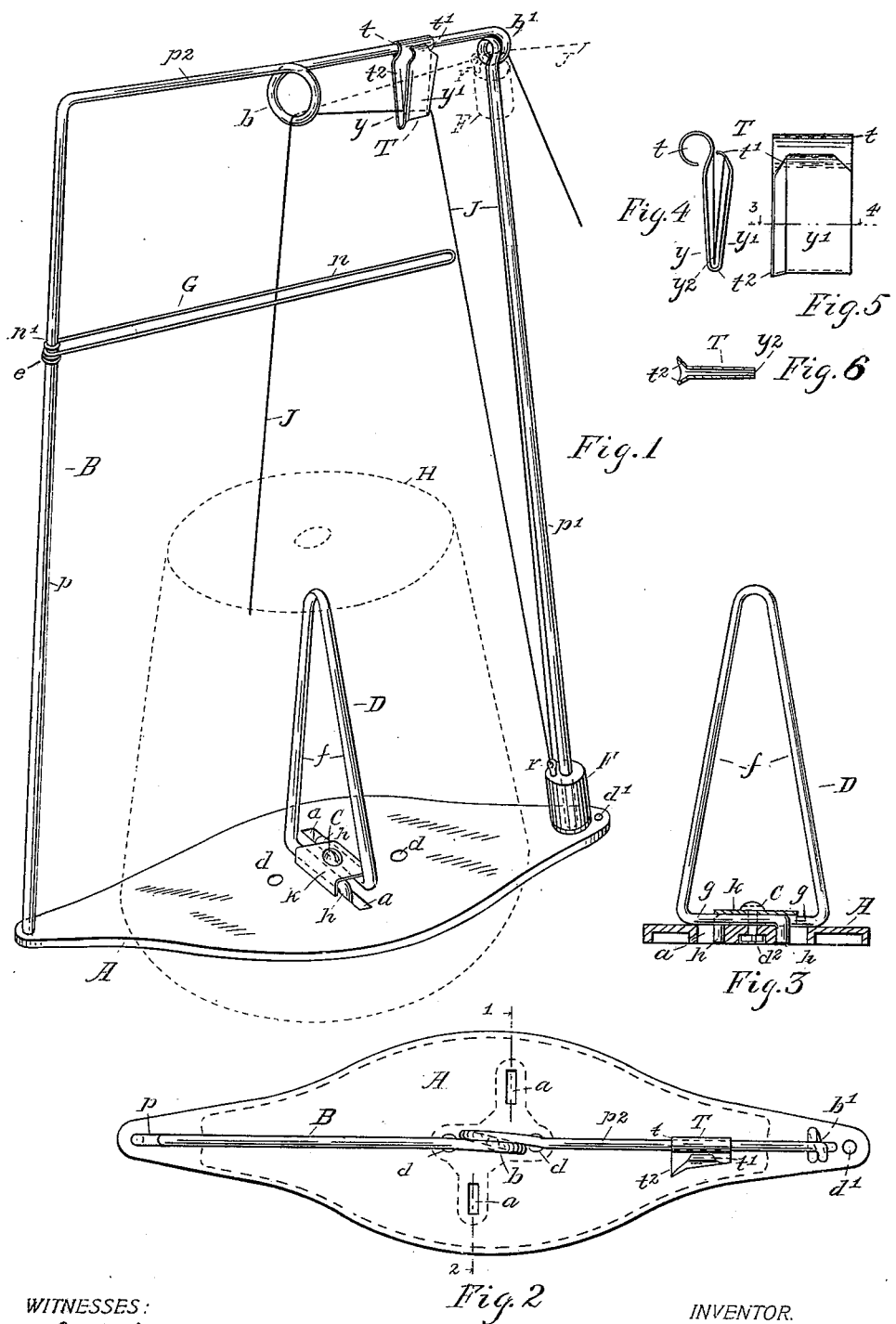

No. 666,943. Patented Jan. 29, 1901.
J. A. THOMPSON.
TWINE HOLDER.
(Application filed May 21, 1900.)
(No Model.)

WITNESSES:
Edwin J. Bailey
Otis M. Moore

INVENTOR.
John A. Thompson,
BY Frank C. Adams
ATTORNEY.

THE NORRIS PETERS CO., PHOTO-LITHO., WASHINGTON, D. C.

UNITED STATES PATENT OFFICE.

JOHN A. THOMPSON, OF SEATTLE, WASHINGTON.

TWINE-HOLDER.

SPECIFICATION forming part of Letters Patent No. 666,943, dated January 29, 1901.

Application filed May 21, 1900. Serial No. 17,437. (No model.)

*To all whom it may concern:*

Be it known that I, JOHN A. THOMPSON, a citizen of the United States of America, and a resident of Seattle, in the county of King and State of Washington, have invented certain new and useful Improvements in Twine-Holders, of which the following is a specification.

My invention relates to improvements in devices which are adapted to retain a twine cone, spool, or ball while permitting portions of the twine to be unwound for use; and I have for the objects thereof to provide a twine-holder which shall embody essential features of simplicity, durability, and general efficiency and which shall embody a take-up for the twine of simple construction and of positive operation to retract the free end of the twine. These objects I attain by the construction, combinations, and arrangements of parts as disclosed on the accompanying drawings and set forth in the following specification.

With reference to the drawings forming a part of this specification, Figure 1 is a perspective view of my improved twine-holder, disclosing in bold lines the position of the several parts of the device and of the twine when the free end thereof has been retracted and by broken lines the position of the twine-cone and also of the free end of the twine when it is drawn for use. Fig. 2 is a plan view of same with the twine-standard and retracting-weight removed from the holder. Fig. 3 is a transverse section of the base-plate on line 1 2 of Fig. 2 with the frame removed. Fig. 4 is an edge elevation of the tension-crotch. Fig. 5 is a side view of same, and Fig. 6 is a transverse section on line 3 4 of Fig. 5.

Similar characters of reference designate corresponding parts throughout the several views of the drawings.

The base A of the twine-holder is preferably formed from plate metal and is substantially elliptical in form, and a suitable wire frame, as B, is attached thereto and affords support for various parts of the device and also serves as a bail when desirable to suspend the twine-holder. Suitable apertures, as $d$ $d$ and $d'$, are provided in the base-plate A, through which screws are passed to secure the twine-holder to a table or other convenient object, and a centrally-located aperture $d^2$ is also provided to receive a bolt, as C, by which a suitable twine-retaining device is secured to the base. When the device is so positioned that the portion of the base A, containing the opening $d'$ is not upon a support, (as when the device is suspended,) the free end of the twine can be passed through said opening $d'$, which thus forms an additional guide.

The frame B is formed of suitable wire bent to approximately a U shape and occupies an inverted position with the ends of the side stems $p$ and $p'$ fastened to the base A, adjacent opposite ends of the major diameter thereof, and in forming the frame suitable guides for the free end of the twine J, as $b$ and $b'$, are formed by bending the wire to inclose an eye substantially midway the length of the portion $p^2$ of the frame to form the guide $b$ and a second eye at the upper end of the stem $p'$ to form the guide $b'$.

A twine-retaining device, as D, is preferably employed to secure the position of the twine cone or spool and comprises an adjustable standard, which can be expanded or contracted to fit it to bores of different diameters, as occurring in the cores of the various twine cones or spools now on the market. This adjustable standard preferably comprises a piece of resilient wire bent midway its length to inclose an acute angle and form legs $f$ of equal length, which are each provided with a foot $g$ at the lower end, conveniently formed by bending the ends of the wire horizontally and inwardly, and a suitable heel $h$ is formed at the free end of each foot by bending the ends of the wire downwardly. The standard D rests upon the base-plate A, with the heels $h$ projecting downwardly in suitable slots $a$ in the base-plate A, which slots are of suitable length to permit the heels to move as the standard is adjusted by forcing the legs $f$ together or permitting them to spring apart, and when the standard is spread to maximum size the heels contact the inner end walls of the slots and prevent extreme spreading of the legs $f$. To secure the standard in position upon the base A and to lock it at any desired adjustment, a plate $k$ is placed upon the feet $g$, and the bolt C is employed to clamp said feet between the base A and plate $k$.

A tension-crotch, as T, is suitably positioned at a point intermediate the guides $b$ and $b'$ and in line therewith, so as to receive the twine J between said guides. This tension-crotch comprises substantially a V-shaped member, which is suitably placed to position the apex thereof below the said guides, whereby the twine is freed from the crotch $y^2$ when drawn to a horizontal line, as indicated by dotted lines in Fig. 1, but is fastened or locked in said crotch when sagged downwardly by a suitable take-up, as the weight F.

The weight F is conveniently provided with an eye $r$, through which the twine J passes, between the tension-crotch T and guide $b'$ and is adapted to engage the stem $p'$ as a guide and to reciprocate thereon as the free end of the twine is drawn taut and released. When the weight F is raised to the position indicated by dotted lines in Fig. 1, the eye $r$ is in line with the guides $b$ and $b'$ and the twine is released from the crotch $y^2$ of the tension T.

The tension-crotch T is preferably formed from a strip of resilient sheet metal, which is first bent to form a bevel $t^2$ along one side edge to provide a flaring mouth when the V is formed. The strip is then rolled at one end to form an eye $t$, by which the device is attached to the portion $p^2$ of the frame B, and is then bent upon itself to form a V-shaped member comprising opposing stems $y$ and $y'$, diverging upwardly from a crotch $y^2$, and the free end of the stem $y'$ is preferably bent inwardly to form a stop $t'$, adapted to keep the twine J from jumping from the device.

A suitable guard-finger, as G, is preferably employed at a convenient point intermediate the twine-cone H and the guide $b$ to keep the loops which at times form in the twine as it leaves the periphery of the cone or spool from jumping over the upper corners of the frame B or from catching about the frame or base-plate A. This guard is suitably formed from a piece of wire bent to inclose a slot $n$, through which the twine J is passed, and an eye $n'$ at one end thereof adapted to engage loosely with the stem $p$ of the frame B, upon which a suitable step $e$ is positioned to sustain the guard at the desired elevation with lateral projection over the base A, whereby it is adapted to swing or vibrate as the twine unwinds from the cone and works back and forth in the slot $n$. Thus the guide is made to offer but slight resistance to the twine as it is drawn for use, but forms an effective check to keep it from jumping as it falls from the cone.

To use the twine-holder, a quantity of twine is suitably retained on the base-plate A, and if provided in the form of a twine cone or spool the expansible standard D is adjusted to engage the core thereof in a manner heretofore set forth. The free end of the twine is then passed upwardly and is preferably engaged with the slot $n$ of the guard G, and thence passed through the guide $b$, tension T, the eye of the weight F, and finally through the guide $b'$. In drawing the twine for use the weight F rises to the position disclosed by dotted lines in Fig. 1 and the twine is lifted from the crotch $y^2$ of the tension device T, when it is free to be moved outwardly to supply the required amount. When the twine is released, the weight drops, carrying the twine downwardly until it engages in the crotch $y^2$ of the tension T, which holds the twine securely from outward movement from the twine-cone, and as the weight continues to fall it retracts the surplus twine contained in the free end. In case a knot or other like protuberance should occur on the twine the stem $y'$ of the tension-crotch T will spring outwardly to permit of its passage. Also the flaring mouth formed by the bevel $t^2$ guides the knot as it is drawn into the tension-crotch and keeps it from catching on the edges of the device. If desired, twine of a large diameter may be used on the twine-holder, in which case the use of the weight F can be discontinued, as the twine is placed under tension by the spring of the stem $y'$, and when the twine is drawn for use the frictional contact thus provided prevents the drawing of a surplus amount from the twine-cone, though obviously a retraction of the free end of the twine does not occur. The crotch of the tension T can be also employed to secure the free end of twine when it is removed from the guide $b'$ and from the eye of the weight F, as the desired quantity of twine for use can then be drawn through the tension, when the free end of the unused twine is drawn downward to engage the crotch, and is thus caught between the stems of the V and is prevented from withdrawing therefrom.

Having thus described my invention, what I claim, and desire to secure by Letters Patent, is—

1. In a twine-holder or the like, a substantially V-shaped tension-crotch having a resilient stem with an inwardly-projecting stop adjacent its free end, a part against which said stop bears to determine the normal relation between the sides of the crotch, and a twine-guide located closely adjacent said tension-crotch whereby twine is guided thereto.

2. A tension device of the nature indicated comprising side members yieldingly held adjacent each other and adapted to pass twine or the like between them, the edges of said side members toward the direction from which the twine moves in passing being flared outwardly.

3. A tension device of the nature indicated comprising side members which are connected together at one point and are yieldingly held toward each other, and a stop interposed between said side members at another point to limit the approach of said side members toward each other.

4. A tension device of the nature indicated comprising side members which meet at one point and are yieldingly held toward each other, and a stop interposed between said side members at another point to limit the approach of said side members toward each other.

5. A tension device of the nature indicated comprising side members which meet at one point and are yieldingly held toward each other, and a stop upon one of said members and extending toward the other of said members at another point to limit the approach of said side members toward each other.

6. A tension device of the nature indicated comprising a strip of resilient material bent upon itself to form a substantially V-shaped notch, one of the side members thus produced having its free end bent inwardly to produce a stop adapted to engage the opposite side member.

7. In a twine-holder or the like, a tension-crotch composed of a strip of metal of resilient nature bent midway its length to substantially a V shape, and at one end to form an eye, whereby it is positioned, and at the opposite end bent inwardly to form a stop, a guide for twine adjacent each side edge of said tension-crotch, a reciprocatable weight operatively engaged with the twine between said crotch and the outer guide, a guide for the weight and means to limit the fall thereof.

8. In a twine-holder having a suitable base, an adjustable standard to retain a twine-cone or the like comprising legs connected together at their outer ends, and normally yieldingly forced apart, and means for securing said standard to said base.

9. In a twine-holder having a suitable base, an adjustable standard to retain a twine-cone or the like comprising legs of resilient material united at one extremity and adapted to be spread apart or closed at their opposite extremities to vary the size of the standard, and means to secure the same to said base.

10. In a twine-holder having a suitable base, an adjustable standard to retain a twine-cone comprising legs of resilient material united at one extemity and adapted to be spread apart or closed at their opposite extremities to vary the size of the standard, and means to lock said standard when adjusted and to secure same to said base.

11. In a twine-holder having a suitable base, an adjustable standard for twine-cones, comprising legs of resilient material united at their upper extremities, diverging downwardly and adapted to spread apart or to be closed at their lower extremities, means to lock said legs when adjusted and to secure said standard to said base.

12. In a twine-holder having a suitable base, an adjustable standard for twine-cones comprising legs connected at their outer ends and normally yieldingly forced apart, said legs forming an acute angle and adapted to spread or to be closed, feet at the base of the legs, and means to lock said feet to the base and to secure said standard.

13. In a twine-holder having a suitable base-plate, an adjustable standard for twine-cones comprising legs connected at their outer ends and normally yieldingly forced apart, said legs forming an acute angle, feet at the base of said legs, and heels on said feet, means on said base-plate to engage said heels to limit the spread of the legs, and other means to lock said legs when adjusted and secure said standard to the base.

14. In a twine-holder having a suitable base-plate, an adjustable standard for twine-cones formed from a single piece of wire of resilient nature bent midway to provide legs forming an acute angle, the lower extremity of each leg bent inwardly to form a foot and then downwardly to form a heel, slots in said base-plate to receive said heels and to engage same to limit the spread of said legs and means to lock the legs when adjusted and to secure the standard to the base-plate.

15. In a twine-holder comprising a suitable base with a device for retaining a twine-supply and a frame with suitable twine-guides above the base, a guard projected over the base and adapted to extend across a ball of twine supported on said base, said guard being engaged with the twine at a point intermediate said retaining device and guides having an opening for the passage of the twine, whereby loops formed in the twine when drawn from said supply engage the surface of said guard and are prevented from catching about said twine-holder.

16. In a twine-holder comprising a suitable base with a device for retaining a twine-supply and a frame with suitable twine-guides above the base, a vibratory guard projected over the base and adapted to extend across a ball of twine supported on said base, said guard being engaged with the twine at a point intermediate said retaining device and guides and having an opening for the passage of the twine, whereby loops formed in the twine when drawn from said supply engage the surface of said guard and are prevented from catching about said twine-holder.

17. In a twine-holder comprising a suitable base with a device for retaining a supply of twine and a frame with suitable twine-guides thereabove, a guard comprising a horizontally-disposed finger pivoted to said frame and projected over the base and having a slot engaged with the twine at a point intermediate said retaining device and the guides.

18. In a twine-holder comprising a suitable base with a device for retaining a supply of twine and a frame with suitable twine-guides thereover, a vertical pivot on said frame, a guard consisting of a horizontally-disposed finger operatively engaged with said vertical pivot and projected over said base and having a longitudinally-disposed slot engaged with the twine at a point intermediate said retaining device and guides.

19. In a twine-holder comprising a base with a device for retaining a supply of twine and a frame with suitable twine-guides thereabove, a vertically-disposed member supported upon the base, a vibratory guard to prevent loops formed in said twine when drawn from said supply from catching about said holder, and consisting of a horizontally-disposed finger comprising a wire bent to inclose a longitudinally-disposed slot, and an eye at one end operatively engaged with said vertically-disposed member, said slot engaged with the twine intermediate said retaining device and guides.

20. A twine-holder and take-up comprising a suitable base with a wire frame of substantially inverted-U shape bent midway its upper portion to provide a twine-guide and at the upper extremity of one stem to provide a second guide, an adjustable standard for retaining a twine-cone comprising legs of resilient material united at their upper extremities and movable at their lower extremities and means to lock said legs when adjusted and to secure said standard to the base, a guard attached to said frame and projected over the base to engage the twine at a point intermediate said standard and guides, a substantially V-shaped crotch intermediate said guides, and a weight operatively engaged with the twine between said crotch and the outer guide and slidably engaged with the adjacent stem of the frame.

Signed at Seattle, Washington, this 11th day of May, 1900.

JOHN A. THOMPSON.

Witnesses:
ARTHUR L. CAMPBELL,
DORANCE H. DORMAN.